US009189094B2

(12) United States Patent
Morikawa et al.

(10) Patent No.: US 9,189,094 B2
(45) Date of Patent: Nov. 17, 2015

(54) DISPLAY CONTROL APPARATUS AND DISPLAY SYSTEM WITH POINTER CORRECTION

(71) Applicant: DENSO CORPORATION, Kariya, Aichi-pref. (JP)

(72) Inventors: Shohei Morikawa, Ichinomiya (JP); Takeshi Kawashima, Nisshin (JP); Hirotaka Goto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 13/769,501

(22) Filed: Feb. 18, 2013

(65) Prior Publication Data

US 2013/0215021 A1    Aug. 22, 2013

(30) Foreign Application Priority Data

Feb. 20, 2012    (JP) ................................. 2012-034281

(51) Int. Cl.
*G06F 3/033*    (2013.01)
*G06F 3/041*    (2006.01)
*G06F 3/0484*    (2013.01)
*G06F 3/0488*    (2013.01)
*G06F 3/0481*    (2013.01)

(52) U.S. Cl.
CPC ............ *G06F 3/041* (2013.01); *G06F 3/04812* (2013.01); *G06F 3/04842* (2013.01); *G06F 3/04886* (2013.01)

(58) Field of Classification Search
CPC ....................................................... G06F 3/038
USPC .......................................... 345/157, 173, 174
See application file for complete search history.

(56) References Cited

U.S. PATENT DOCUMENTS

| 6,587,131 | B1 * | 7/2003 | Nakai et al. .................... 715/857 |
| 2004/0263472 | A1 | 12/2004 | Tachikawa | |
| 2008/0163129 | A1 * | 7/2008 | Lee et al. ........................ 715/859 |
| 2009/0309830 | A1 | 12/2009 | Yamamoto | |

(Continued)

FOREIGN PATENT DOCUMENTS

| JP | B2-3033465 | 4/2000 |
| JP | 2001-306215 | 11/2001 |

(Continued)

OTHER PUBLICATIONS

Office action dated Jan. 28, 2014 in corresponding Japanese Application No. 2012-034281.

*Primary Examiner* — John Kirkpatrick
(74) *Attorney, Agent, or Firm* — Harness, Dickey & Pierce, PLC

(57) ABSTRACT

A display control apparatus controls a plurality of buttons displayed on a screen of a display unit. The apparatus, via a detection unit and position calculation unit, calculates a pointer position on the screen that corresponds to a contact position on an input screen that is touched by a fingertip of user. A button selection unit selects one button, as a desired button, from among the plurality of buttons on the screen based on the pointer position. A selected button display control unit displays the desired button on the screen in a display mode different from the buttons not selected. A position correction unit corrects a current pointer position to be at a reference line when the reference line extends in a specific direction from a previous pointer position and the current pointer position is within a specific range that is set to include the reference line.

12 Claims, 8 Drawing Sheets

(56) References Cited

U.S. PATENT DOCUMENTS

| | | | |
|---|---|---|---|
| 2010/0171713 A1* | 7/2010 | Kwok et al. | 345/173 |
| 2011/0082627 A1* | 4/2011 | Small et al. | 701/48 |
| 2011/0320978 A1* | 12/2011 | Horodezky et al. | 715/823 |
| 2013/0047110 A1 | 2/2013 | Shimizu | |

FOREIGN PATENT DOCUMENTS

| | | |
|---|---|---|
| JP | 2008-265544 | 11/2008 |
| JP | 2011-051427 | 3/2011 |
| JP | 2011-123750 | 6/2011 |
| JP | 2011-233082 | 11/2011 |

\* cited by examiner

DISPLAY CONTROL APPARATUS AND DISPLAY SYSTEM WITH POINTER CORRECTION

CROSS-REFERENCE TO RELATED APPLICATION

This application is based on and claims the benefit of priority of Japanese Patent Application No. 2012-34281 filed on Feb. 20, 2012, the disclosure of which is incorporated herein by reference.

TECHNICAL FIELD

The present disclosure generally relates to a display control apparatus for controlling multiple buttons on a screen of a display device to display one of the buttons, which was selected by a user, differently from the other buttons.

BACKGROUND

Conventionally, a graphical user interface (GUI) lets a user choose a desired button from among multiple buttons that are displayed on a screen. Such a GUI is disclosed in Japanese Patent Laid-Open No. 2011-51427 (JP '427). More practically, when the user performs a slide operation by sliding his/her fingertip on a touch pad, a pointer moves on a screen. The pointer may be positioned over one of the buttons, which may be provided as a selected button. When the pointer moves over such selected button, the selected button may be displayed in a manner different from the other buttons. In other words, the selected button may be emphasized by, for example, an added outline or a change of color, which is different from the other buttons. By displaying the selected button in a different manner, the GUI indicates that the button is in a selected state.

By having the selected button displayed in a manner different from the other buttons, the user can distinguish the button that is currently being selected at, even when an image of the pointer is not displayed on the screen. Accordingly, based on the slide operation of the user's fingertip on the touch pad, the button having the pointer changes, therefore, the emphasis placed on a selected button transitions across from one button to another in accordance with the slide operation on the touch pad.

However, the slide operation of the fingertip may not always trace an intended line (e.g., a straight line) in spite of the user's intention. That is, even when the user thinks that his/her hand or finger is moving in a straight line, the trace of the movement may actually be a curve. Such a curve may likely be drawn as a portion of a circle that has its center aligned with one and of the user's arm when the user's arm is on a structure close to the touch pad.

In such a case, when an image of the pointer is not displayed on the GUI screen, the user cannot recognize the curved movement of the fingertip, until the transition of the emphasis placed on a selected button moves in a different direction. For instance, the transition of the emphasis on the buttons moves along an intended direction from the start of the finger movement up to a middle of an intended course of movement, and then the transition of the emphasis suddenly goes in another direction, which is different from the user's intention's. Such change in direction may be caused by the curved trace of the fingertip.

The actual movement of the pointer gradually departs, which may be not recognized, from the intended direction during the movement. Therefore, even when the user intends to select one button at a far end of a row arrangement of buttons by the pointer from the other end of the row of buttons, the finger movement may start to select (i.e., emphasize) the buttons on a different row, if there are two or more rows of buttons. Thus, when the user sees such result based on the movement of his/her fingertip, the user may feel uncomfortable, or believe that something is wrong with the device or the user's operation.

SUMMARY

In an aspect of the present disclosure, a display control apparatus controls a plurality of buttons displayed on a screen of a display unit. The display control apparatus may include: a detection unit, a position calculation unit, a button selection unit, a selected button display control unit, and a position correction unit.

The detection unit detects a contact position on an input plate that is touched by a fingertip of a user. The position calculation unit calculates a position of a pointer on the screen, as a pointer position, which corresponds to the contact position detected by the detection unit. Based on the pointer position, the button selection unit selects one button, as a desired button, from among the plurality of buttons on the screen, and the selected button display control unit displays the desired button on the screen in a display mode different from the buttons not selected.

The pointer position may be corrected by the position correction unit. In particular, a current pointer position is corrected based on a previous pointer position, which is a pointer position at a predetermined time prior to the current pointer position. The position correction unit corrects the current pointer position, such that it is positioned at a reference line when the reference line extends in a specific direction from the previous pointer position and the current pointer position is within a specific range that is set to include the reference line.

According to the above, when a slide movement of the fingertip moving in a certain direction is performed on the input plate, the pointer position is corrected onto or closer to the reference line even when the fingertip departs from the reference line if such departure is within the specific range. Therefore, an arc shape fingertip movement departing from an intended straight line (i.e., the reference line) will not automatically lead to a large departure of the pointer position away from the reference line. As a result, the correction made to the pointer position prevents a mis-selection of a button when, for example, the buttons are arranged in two rows or more. Accordingly, the display control apparatus navigates the screen along a user-intended straight line and prevents an incorrect selection and misidentification of a desired button.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Embodiments of a display control apparatus regarding the present disclosure are described with reference to the drawings. In the following embodiments, like parts have like numbers, and description of the parts will not repeated for the brevity of the specification.

First Embodiment

Figure 1:
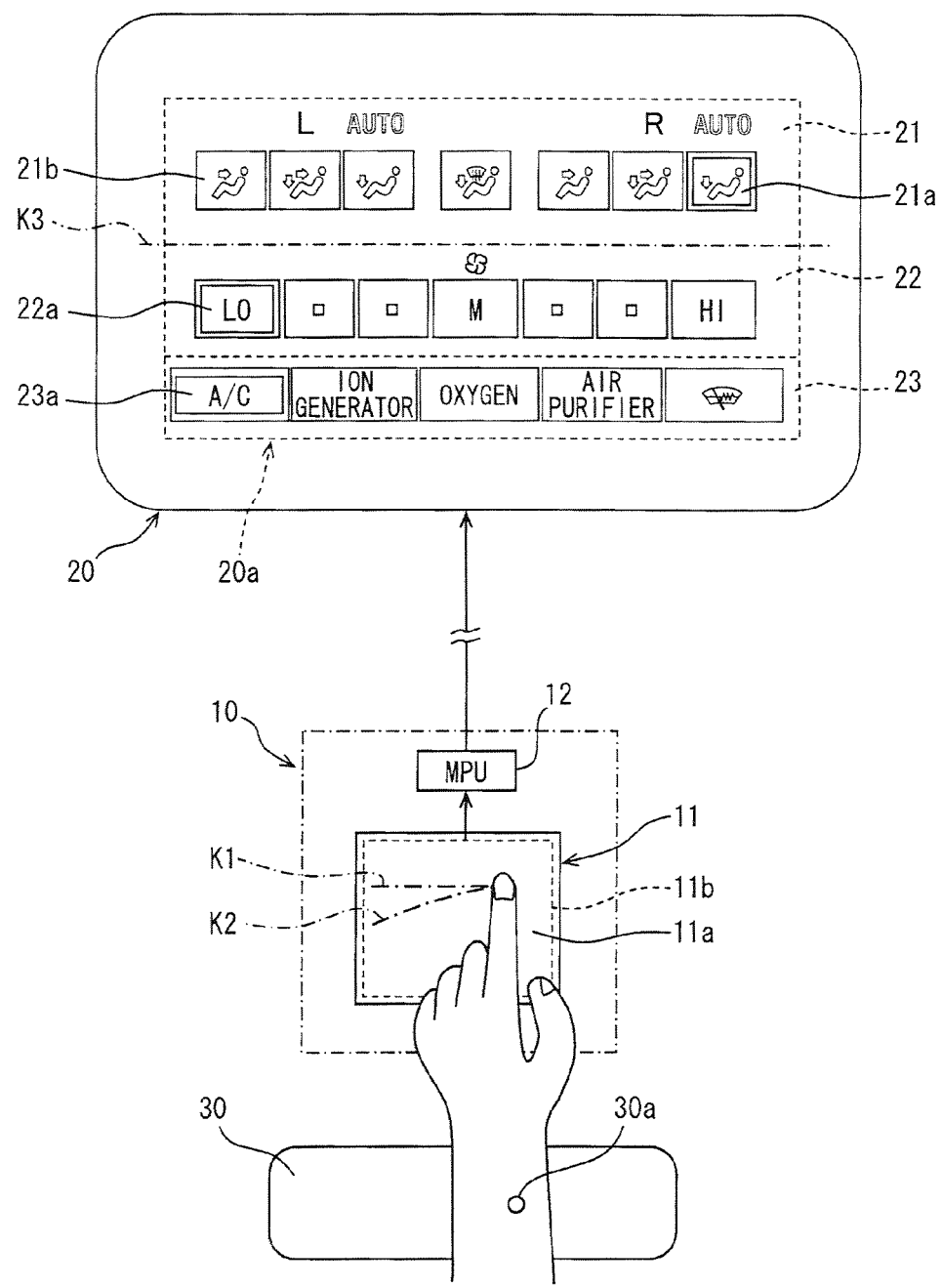
FIG. 1 is an illustration of a remote operation apparatus and a remotely-put display unit of the present disclosure.

With reference to FIG. 1, a remote control apparatus 10 is installed in a vehicle, i.e., within a reach of a user (e.g., a driver) of a vehicle compartment. The contents of the operation on the remote control apparatus 10 are displayed on a remotely-put display unit 20 (i.e., display unit 20). The display unit 20 is installed at a position close to a front windshield, and the remote control apparatus 10 is installed on a center console that is located between a driver's seat and a passenger's seat. In other words, the remote control apparatus 10 and the display unit 20 are disposed separately at different positions, and the position of the display unit 20 is arranged to be above the position of the remote control apparatus 10.

Due to the separate arrangement of the remote control apparatus 10 and the display unit 20, the driver can look at the display unit 20 without substantially moving the look direction of his/her eyes when driving the vehicle. Further, due to the position of the remote control apparatus 10, which is close to the user's hand, the driver can operate the remote control apparatus 10 without substantially changing his/her position, while driving the vehicle.

Further, the remote control apparatus 10 can be operated "blindly," without the user watching his/her hand (i.e., designated as "blind operation" hereinafter). That is, the user can perform a blind operation on the remote control apparatus 10 by watching only an operation menu that is displayed on the display unit 20, for controlling vehicular devices.

The remote control apparatus 10 is a device for inputting a control regarding operation information of the vehicular devices in the vehicle. More practically, the remote control apparatus 10 is used to control the vehicular devices, such as a navigation apparatus, an audio/visual product, a television, a radio, and an air conditioner in the vehicle.

The display unit 20 displays the operation information for controlling the vehicular devices, as well as the operation state and operation menus of the vehicular devices.

The remote control apparatus 10 includes a touch pad 11 operated by the user and a microprocessor unit 12 (MPU 12). The touch pad 11 has an input plate 11a, a sensor 11b, and the MPU 12. The sensor 11b detects a change of capacitance due to the movement of the fingertip when the user moves the fingertip on the input plate 11a.

Based on a detection value from the sensor 11b (i.e., a detection unit in claims), the MPU 12 calculates, at a predetermined interval (e.g., every 10 milliseconds) operation trace information, such as a touch position of the fingertip on the input plate 11a, a movement amount on the input plate 11a, and a movement angle on the input plate 11a. Based on the operation trace information, the MPU 12 calculates a position of a pointer (i.e., a pointer position) on the display unit 20, which corresponds to the movement of the user's fingertip on the touch pad 11. An image representing the pointer position may not appear on the display unit 20, and is not required to be shown. The MPU 12 may be referred to as a position calculation unit in claims.

The MPU 12 moves, from a previous position to a current position, the pointer position according to a vector that has the movement angle and the movement amount from the current calculation of those values. The pointer position is updated to have position coordinates representing the current position after such pointer movement according to the vector.

The screen 20a displays multiple icon buttons arranged in a row, which form a straight line. In FIG. 1, three lines of buttons are formed in a lateral direction of the vehicle (i.e., in a left-right direction of FIG. 1). An upper display portion 21 includes an upper row (i.e., a first row) of the three-row arrangement and may display air outlet selection buttons for selecting an air outlet from which air from the air conditioner is outputted. The air outlet allows air to flow into the vehicle compartment from the air conditioner. A middle display portion 22 includes a middle row (i.e., a second row) of the three-row arrangement and may display air amount selection buttons for selecting an amount of air from the air outlet. A lower display portion 23 includes a lower row (i.e., a third row) of the three-row arrangement and may display ON-OFF buttons (i.e., start/stop switches) of various functions. Accordingly, each row of buttons has a group of buttons in the same functional category.

The MPU 12 determines that a button closest to the pointer position is a user-selected button (i.e., a selected button). Accordingly, the MPU 12 displays the selected button in a mode that is different from an un-selected button. For example, a thick button outline may be used as a selected mode for emphasizing the selected button from the un-selected buttons, which are displayed in a normal mode (e.g., a thin button outline). In FIG. 1, three buttons are selected and displayed in the selected mode button to emphasize them from the other buttons. The three selected buttons include: a foot setting button 21a of upper display portion 21, which sets the air outlet towards the feet for letting the air out from a foot air outlet; a minimum amount button 22a of the middle display portion 22, which sets the amount of air to be outputted at the lowest level; and an auto control button 23a of the lower display portion 23, which sets an automatic control of the air temperature. The MPU 12 may be referred to as a selected button determination unit and a selected button display control unit in claims.

Further, when the fingertip touches the touch pad 11, the MPU 12 determines the button closest to the pointer position as the selected button. Next, a slide movement of the fingertip from such state results in a movement of the pointer position. According to the movement of the pointer position, the button closest to the pointer position changes to the selected mode whereas the other buttons are in the normal mode. Therefore, in accordance with the movement of the pointer position the buttons transition i.e., from one button to the other) to the selected mode.

For instance, when air outlet selection buttons, which are displayed in the upper display portion 21, are operated to change an air outlet setting from the foot setting to a face setting, the touch pad 11 may be operated in the following manner. If the pointer position is in an area of the foot setting button 21a at the time the fingertip touches the touch pad 11, the foot setting button 21a is displayed as being selected (i.e., in the selected mode). Subsequently, if the fingertip is moved in a sliding manner towards the left, the buttons positioned in the upper display portion 21 will change from the normal mode to the selected mode then again to the normal mode from right to left as the pointer position moves close to the button and then moves away from the button.

When the user visually recognizes such transition of the selected mode, the user can stop the slide movement of the fingertip at a desired position, such as at the face setting button 21b. After confirming that the face setting button 21b is in the selected mode (i.e., is displayed in the selected mode), the user can press a determination switch (not illustrated), or can perform a tap operation on the input plate 11a to set the air outlet setting.

To use the touch pad 11 in the above described manner, the user may firmly place his/her wrist on a palm rest 30, which allows the fingertips to move on the touch pad 11. The user's fingertip may actually draw a curved line trace K2, which is centered on the wrist of the hand that serves as a center point 30a, on the input plate 11a, while intending to draw a straight line trace K1, which extends in a left-right direction on the input plate 11a. The pointer position may slide into another row, e.g., into the middle row in the middle display portion 22, to point to an area of an unintended button (e.g., the button 22a) instead of pointing to the button 21b. Therefore, the MPU 12 in the present embodiment determines whether the user's intention is to move the fingertip in the left-right direction based on the operation trace information, and, in case the user's intention is determined as a left-right direction movement, the pointer position is corrected according to the straight line trace K1. The MPU 12 may be referred to as a position correction unit in claims.

Details of such correction are described in the following.

Figure 2:
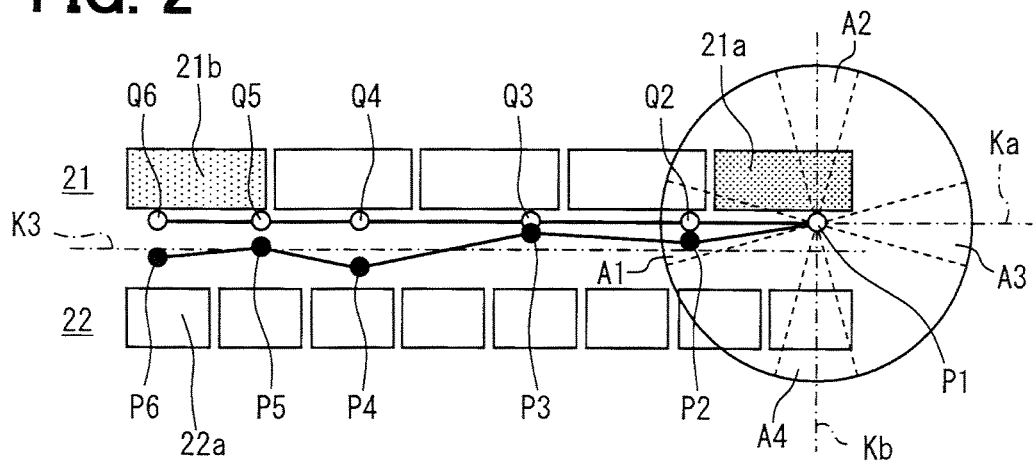
FIG. 2 is an illustration of the remotely-put display unit of FIG. 1.

With reference to FIG. 2, an expanded view of the upper display portion 21 and the middle display portion 22 is provided. A dashed-dotted line K3 is an area border line between the upper display portion 21 and the middle display portion 22. When the pointer position is above the border line K3, a button in the upper display portion 21 is selected. Further, black dots P1 to P6 show uncorrected pointer positions, which have no correction regarding the pointer position, and dots Q2 to Q6 show corrected pointer positions, which have correction to the pointer position. When the fingertip is moved from the right to the left on the input plate 11a, as described above, the continuously calculated pointer positions are updated one by one from P2 to P3 to P4 to P5 to P6. If no position correction is performed, such transition crosses the border line K3 at P4 and P6, thereby shifting the selected mode into the middle display portion 22.

In contrast, the corrected pointer positions are updated as Q2 to Q3 to Q4 to Q5 to Q6. Therefore, the pointer position moves horizontally in the left-right direction. That is, the position of the selected mode transitions in the left-right direction, thereby preventing the selected mode from shifting to the other row (e.g., the middle display portion 22) before the selected mode reaches the desired button.

Figure 3:
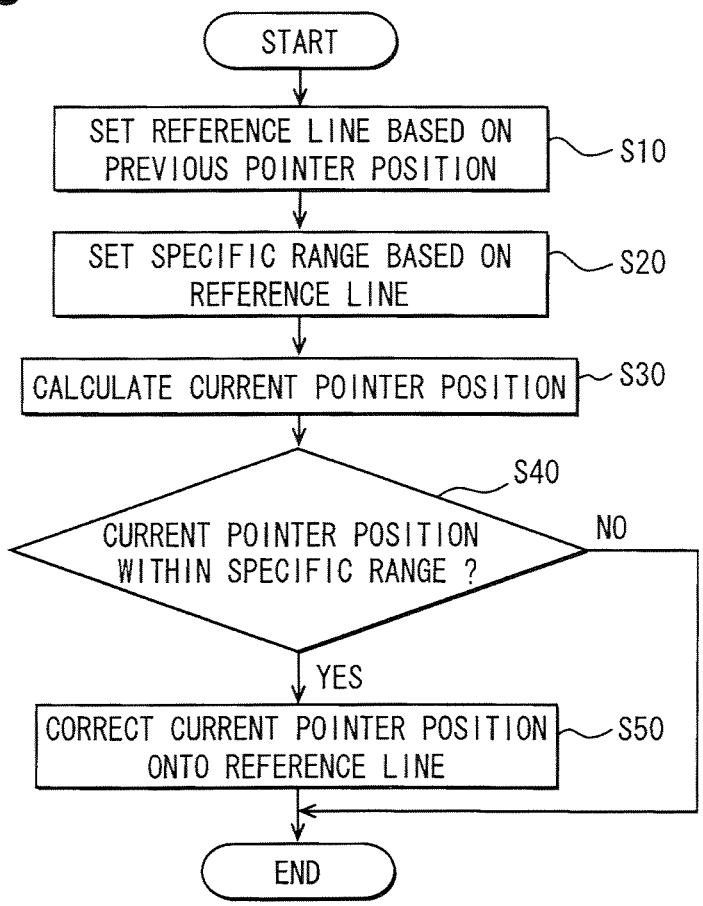
FIG. 3 is a flowchart of a correction procedure of a pointer position in the first embodiment of the present disclosure.
Figure 4:
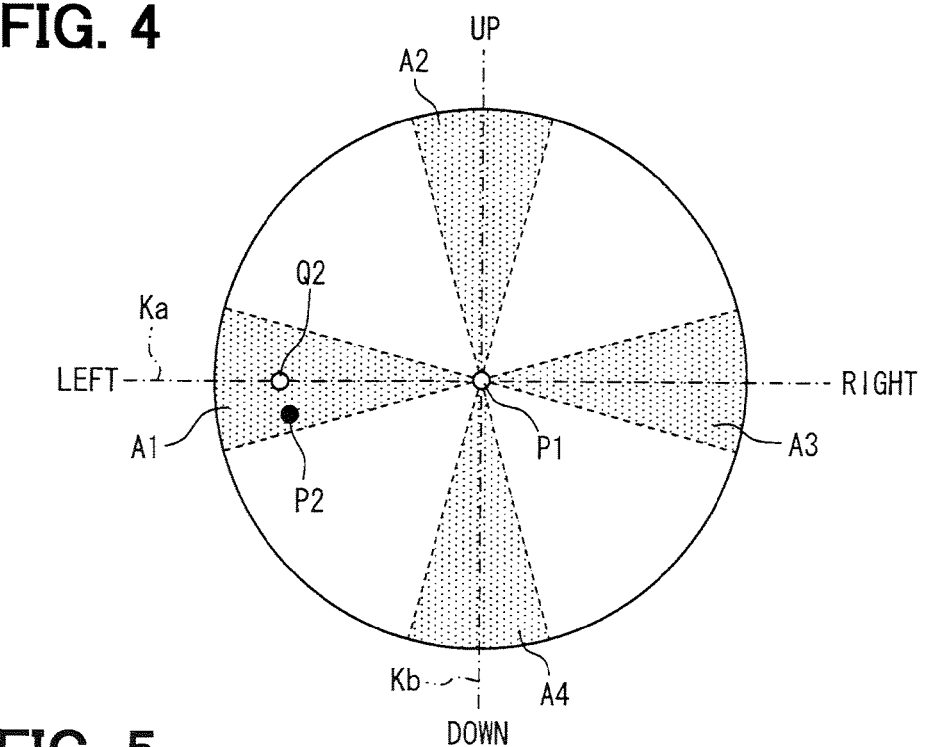
FIG. 4 is an illustration of specific ranges of the first embodiment.

With reference to FIGS. 3 and 4, the determination of the user's intention is performed in the following manner, or, in other words, a determination method for determining whether to perform the correction of the pointer position is described next.

The process of FIG. 3 is performed repeatedly at scheduled intervals by the MPU 12, and is performed when a touch of the fingertip is detected on the touch pad 11.

Further, a mark P2 in FIG. 4 represents a currently-calculated pointer position and a mark P1 represents a previously-calculated pointer position (i.e., a position calculated before a predetermined time of calculation of the current position). The following description describes a situation in which the current pointer position P2 is corrected to the position Q2.

First, at S10 of FIG. 3, the MPU 12 sets two reference lines (i.e., straight lines) Ka and Kb, respectively extending in a horizontal axis (i.e., right and left directions) and in a vertical axis (i.e., up and down directions) from the previous pointer position P1. Further, the previous pointer position P1 in this case indicates a corrected pointer position after the correction at S50, which will be described later. The one of the right, left, up, down directions may be referred to as a specific direction in claims.

At S20, the MPU 12 sets a preset angle range around the reference lines Ka and Kb. Such ranges are designated as specific ranges A1, A2, A3, and A4, and each of the ranges has either the line Ka or the line Kb as its center line.

The MPU 12, at S30, calculates the current pointer position P2. More practically, a position after the movement from the previous pointer position P1 by the vector, which includes the movement angle and the movement amount, is calculated as the current pointer position P2. Next, at S40, the MPU 12 determines whether the current pointer position P2 exists within one of the specific ranges A1 to A4.

When the MPU 12 determines that the current pointer position P2 is in one of the specific ranges A1 to A4 (S40: YES), for example, specific range A1, it determines that the user has an intention to move the pointer in a direction of the specific range in which the current pointer position P2 is detected. Subsequently, at S50, the MPU 12 corrects the current pointer position P2 onto the reference line Ka, which is included in the specific range A1 in which the current movement of the pointer P2 is contained. More practically, the position P2 is corrected to a position along the line Ka (i.e., on-line position), which is closest to the pointer position P2 before-correction, such as the corrected pointer position Q2.

On the other hand, when the MPU 17 determines that the current pointer position P2 is not within the specific ranges A1 to A4 (S40:NO), the process of FIG. 3 concludes itself without performing the correction in step S50.

According to the present embodiment, the pointer position after the slide movement of the fingertip on the input plate 11a intended to follow the reference line Ka or line Kb is corrected onto one of the reference lines Ka and Kb, as long as the fingertip position after such movement departing a little bit from the specific direction is within one of the specific ranges A1 to A4. Therefore, even when the movement of the fingertip departs from the line Ka, as indicated by the black dots P2 to P6 in FIG. 2, the pointer position is corrected onto the line Ka, thereby preventing the transition of the selected mode of the buttons shifting into the other row that is different from a row including the desired button 21b during the movement of the fingertip.

Further, when the current pointer position is not within one of the specific ranges A1 to A4, it is highly possible that the user is diagonally moving his/her fingertip in a sliding manner, with an intention to select a button in the other row. However, in such a case, it is not easy to determine the-intended button that is to be selected by the user (i.e., it is not easy to find that which one of the other rows includes the-desired button).

Therefore, in the present embodiment, the process prohibits the correction of the pointer position based on a prediction of the slide direction when the current pointer position is not in one of the specific ranges A1 to A4. That is, providing the selected appearance for non-intended buttons that are not intended/desired by the user is prevented, thereby preventing the user to have uncomfortable feeling.

Second Embodiment

Figure 5:
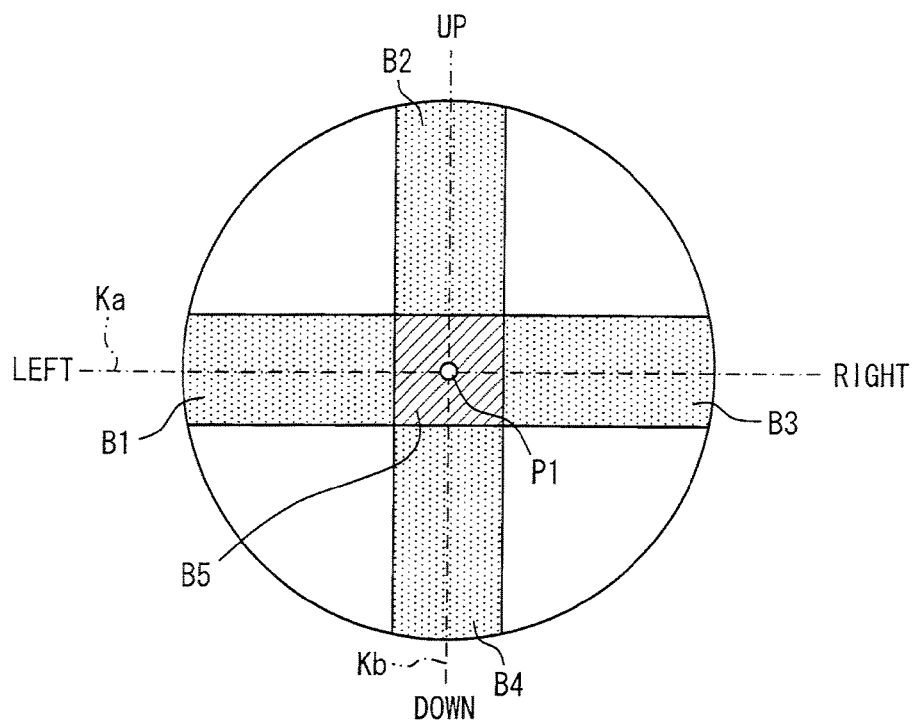
FIGS. 5 and 6 are illustrations of specific ranges in a second embodiment of the present disclosure.
Figure 6:
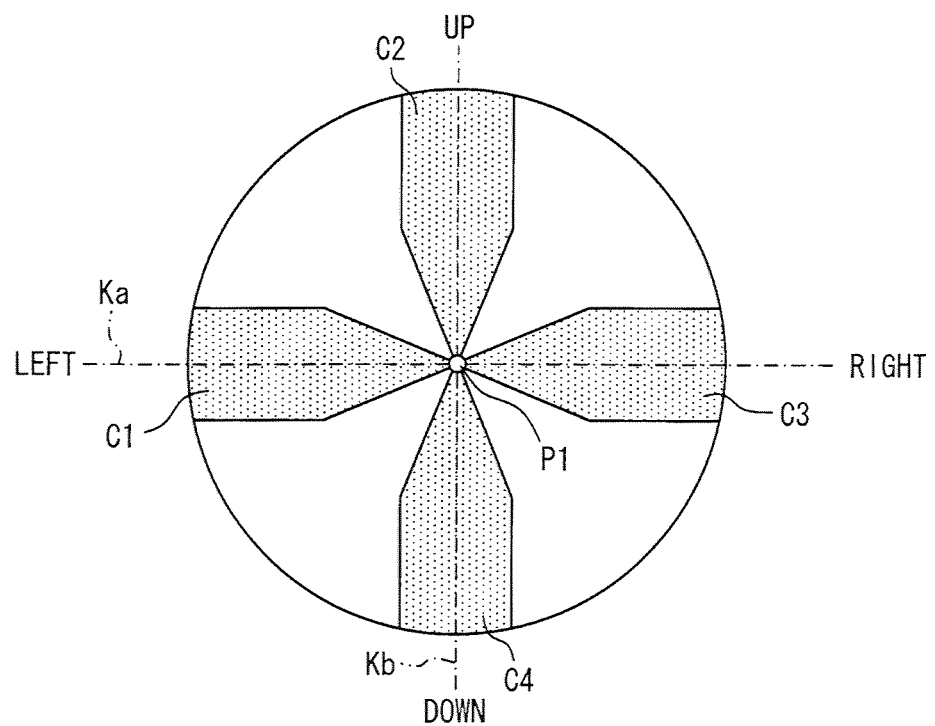

In the first embodiment, the specific ranges A1 to A4 are formed as a fan shape. However, the shape of the specific ranges A1 to A4 may have another shape as shown in FIGS. 5 and 6. In the example of FIG. 5, the MPU 12 uses the reference lines Ka and Kb to define a rectangular range having a predetermined width, which are designated either as a specific range B1, B2, B3, or B4. In such a case, the correction of the pointer position at S50 is prohibited in an overlapping portion of four specific ranges B1 to B4, which includes the previous pointer position P1 and is specified as a range B5 in FIG. 5.

In an example of FIG. 6, the MPU 12 sets specific ranges C1 to C4 as a combination of the ranges A1 to A4 in FIG. 4 and the ranges B1 to B4 in FIG. 5. More practically, the specific ranges C1 to C4 are same as the ranges A1 to A4 in a proximity of the previous pointer position P1, which respectively have a fan shape having a predetermined angle around the reference lines Ka, Kb, and are same as the ranges B1 to B4 at or farther than a predetermined distance from the point P1.

Even when the specific ranges have the above-described shape, the some advantageous effects as the first embodiment are achieved. Further, since the preferable shape of the specific range may change depending on the arrangement of the multiple buttons, the shape of the specific range may preferably be changed according to the arrangement of the buttons.

Third Embodiment

In the first embodiment, no correction is performed for correcting the pointer position when the pointer position is not in the specific ranges A1 to A4. In other words, if the slide movement of the finger points to a diagonal direction, correction of the pointer position will not be performed.

However, when a finger movement speed on the touch pad 11 is slow, it is estimated in the third embodiment that the user intends to select an adjacent button, which is adjacent to the currently-selected button, in the diagonal direction along which the finger slides. In other words, the process assumes that a diagonal button is going to be selected.

Subsequently, the pointer position is corrected to be in an area of the diagonal button. More practically, the pointer position is corrected to be on a line that is defined as a straight line between the previous pointer position and a position of the diagonal button. The position of the diagonal button may be, for example, at one of four corners of the current button that is closest to the diagonal button, or a center position of the diagonal button.

Figure 7:
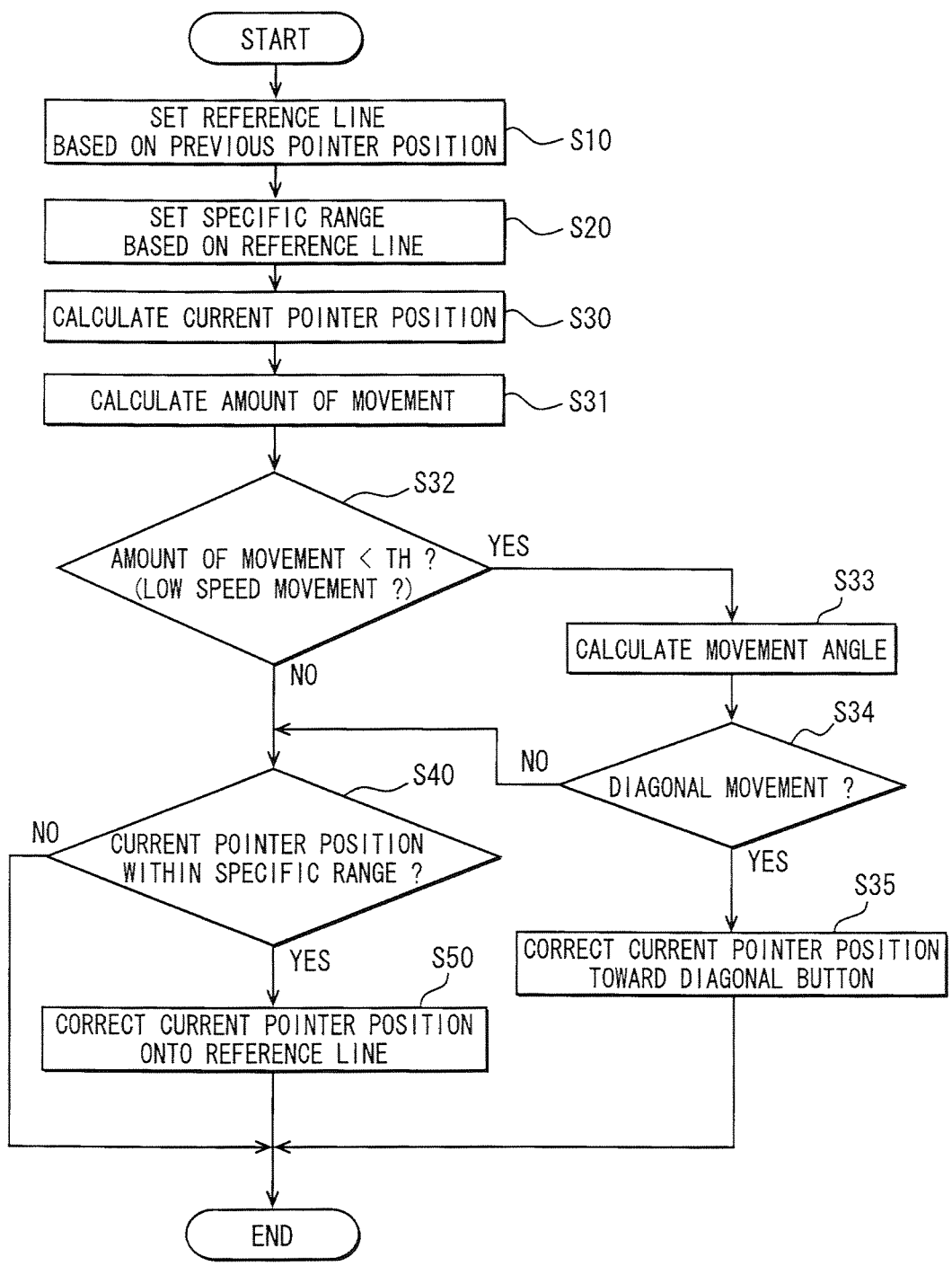
FIG. 7 is a flowchart of a correction procedure of a pointer position in a third embodiment of the present disclosure.

In the present embodiment, the process of FIG. 3 is changed to a process of FIG. 7. In comparing the two processes, the MPU 12 sets the specific ranges A1 to A4 and calculates the current pointer position in the same manner, as S10 to S30 of FIG. 3 of the first embodiment. In S31 of FIG. 7, the MPU 12 calculates the amount of movement (i.e., the movement amount) between the previous position and the current position. Next, at S32, the MPU 12 determines whether the slide movement of the fingertip is a low speed movement, which may be referred to as a low speed determination unit in claims. Since the position of the fingertip is detected at a constant sampling frequency, the amount of movement of the fingertip determines the movement speed of the fingertip. Accordingly, when the amount of movement calculated at S31 is smaller than a threshold TH, the movement speed of the fingertip is determined as a low speed movement.

If the amount of movement is greater than the threshold TH (S32:NO), the movement speed is not a low speed movement and the MPU 12 proceeds to S40, which is the same as FIG. 3 of the first embodiment for correcting the pointer position onto the reference line if the pointer position is within the specific ranges A1 to A4.

On the other hand, if the movement speed of the fingertip is a low speed movement in that the amount of movement is less than the threshold TH (S32:YES), the MPU 12, at S33, calculates a direction of the slide movement (i.e., a movement angle) based on the previous and current pointer positions. The MPU 12 then determines, at S34, whether the pointer position movement is a diagonal movement in a diagonal direction based on the calculated movement angle. In the determination at S34, it may be determined that the movement is in the diagonal direction, i.e., a diagonal movement, when the current pointer position is not within the specific ranges A1 to A4.

If the movement angle is not the diagonal movement (S34:NO), the MPU 12 proceeds to S40. If the movement angle is the diagonal movement (S34:YES), the MPU 12, at S35, corrects the current pointer position, so that the current pointer position includes a slide movement moving toward the diagonal button. In other words, the MPU 12 corrects the current pointer position onto a straight line that is defined by the previous pointer position and the position of the diagonal button. The MPU 12 may be referred to as a low speed time correction unit in claims based on the performance of S35.

The user is expected to move the finger slowly, in a sliding manner, when he/she selects an adjacent button (i.e., a diagonal button) that is positioned close to the currently-selected button. Therefore, in the present embodiment, at a time of low speed movement, the MPU 12 corrects the pointer position to be closer to a button that seems to be targeted by the user as the selected button even when the current pointer position caused by the diagonal movement is not included in one of the specific ranges A1 to A4. Therefore, when the desired button exists in a diagonal direction of the currently-selected button, the accuracy at which the selected mode is used on such button is improved.

Fourth Embodiment

Figure 8A:
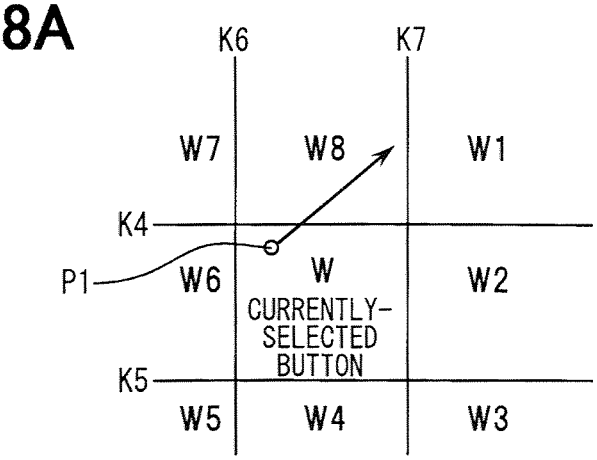
FIGS. 8A and 8B are illustrations of a pointer position correction in a fourth embodiment of the present disclosure.
Figure 8B:
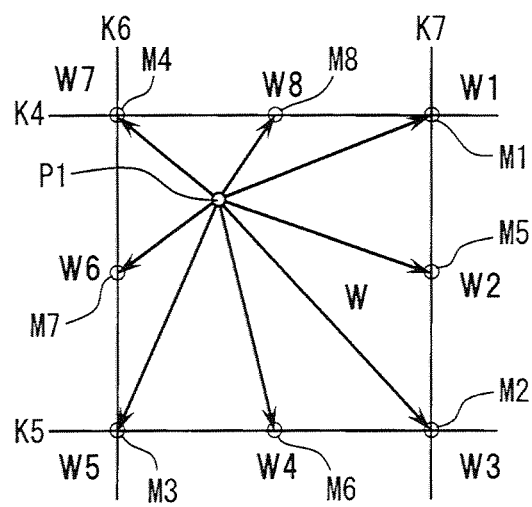

The present embodiment is about a modification of a pointer position correction in the diagonal movement at low movement speed. The problem to be addressed is illustrated with reference to FIGS. 8A to 8B. In FIGS. 8A to 8B, lines K4 to K7 similar to the area border line K3 of FIG. 3, and references W and W1 to W8 represent button areas defined by the lines K4 to K7. In FIG. 8A, the currently-selected and currently-emphasized button corresponds to the area W and is surrounded by the areas W1 to W8, with each of the areas W, W1 to W8 having a rectangular shape, and with the adjacent corners of the areas matching or aligned with each other.

Since the area W is displayed in the selected mode and an image of the pointer is not displayed, the user can only recognize that the pointer position is somewhere in the area W, without knowing exactly where in the area W the pointer position exists. Therefore, in a state in which the area W is emphasized on the screen, the user, who moves the fingertip on the touch pad 11 in a diagonally right upward direction (i.e., arrow of FIG. 8A) with an intention to select a button in the area W1, may result in moving the pointer into the area W8, which is next to the intended area W1. Such a pointer movement and button selection against user's intention are most likely caused when the previous pointer position P1 is in an upper left portion close to a corner of the area W.

Such an undesired pointer movement is prevented in the present embodiment by estimating which one of eight buttons the user intends to select based on the movement angle calculated in the same manner as S33 of FIG. 7, which corrects the pointer position in the low speed movement.

With reference to FIG. 8B, when an estimated button is at one of four corners M1 to M4 of the currently-selected button (i.e., when the estimated button is the diagonal button), the MPU 12 sets, as a reference line, a straight line between the previous pointer position P1 and one of the four corners M1 to M4. The current pointer position is then corrected onto the reference line defined in such manner.

When the estimated button is not at one of four corners M1 to M4 of the currently-selected button (i.e., when the estimated button is not the diagonal button), the MPU 12 sets, as a reference line, a straight line between the previous pointer position P1 and one of four middle points M5 to M8. The current pointer position is then corrected onto the reference line defined in such manner.

In brief, when the movement speed is at a low speed, a specific direction is set as one of eight arrow directions, which are directions pointing to respective buttons. When the pointer movement is not at a low speed, the specific direction is set as one of four directions (i.e., one of up, down, right, and left directions).

Accordingly, the specific direction is changed according to the movement speed of the pointer, and the reference line is also changed according to the movement speed. In such manner, the accuracy in emphasizing the correct button (e.g., emphasizing W1 instead of W8) is improved.

Further, when the movement speed is not a low speed, it is assumed that the user does not intend to select the adjacent button, and the correction for the diagonal movement is prohibited just like the first embodiment. Therefore, adding an emphasis on a wrong and unintended button is prevented, thereby improving the accuracy of an emphasizing the correct desired button.

Fifth Embodiment

In the fourth embodiment described above, the reference line is set as one of four lines toward the middle points M5 to M8 of FIG. 8B when the pointer is moved in one of the up/down/right/left directions at a low movement speed.

Figure 9:
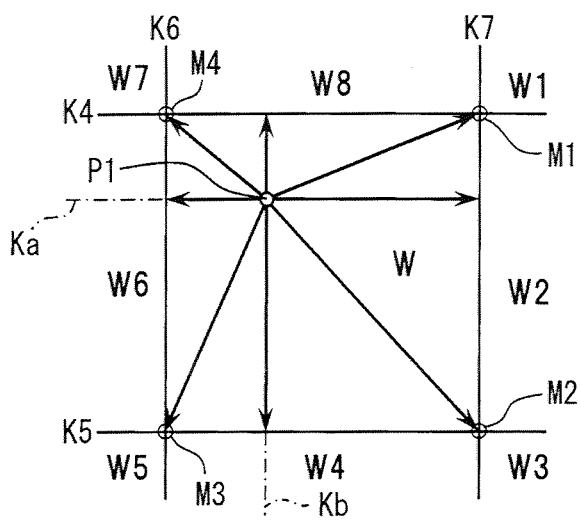
FIG. 9 is an illustration of a pointer position correction in a fifth embodiment.

With reference to FIG. 9, in the fifth embodiment, when the pointer is moved in one of the up, down, right, left directions at a low movement speed, the reference line is set as one of four lines in the up, down, right, left directions from the previous pointer position. Specifically, when the pointer is moved in the up, down, right, or left directions either at a low speed or not at a low speed, one of the up, down, right, left directions is considered as the specific direction, and the reference line is set accordingly. In such manner, the processing load of the MPU 12 is reduced in comparison to the correction that corrects the pointer position onto a line set from the current previous pointer position toward one of four middle points M5 to M8.

Sixth Embodiment

Figure 10A:
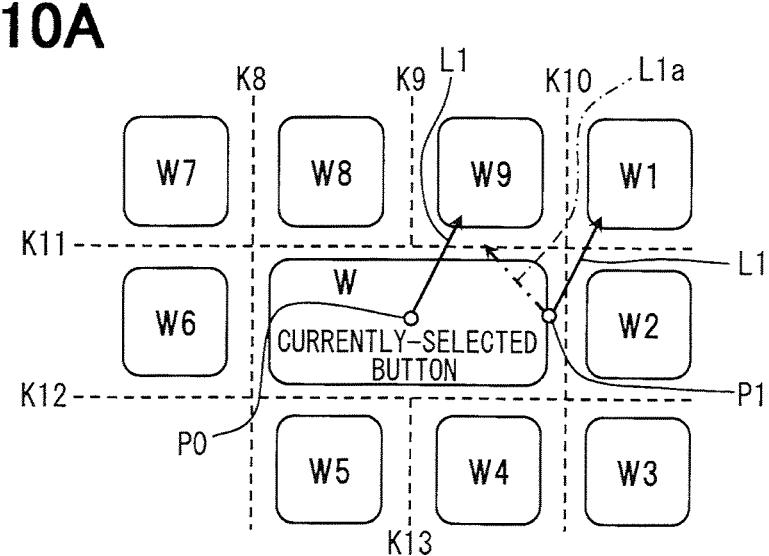
FIGS. 10A, 10B, and 10C are illustrations of a button arrangement and a pointer position correction in a sixth embodiment of the present disclosure.
Figure 10B:
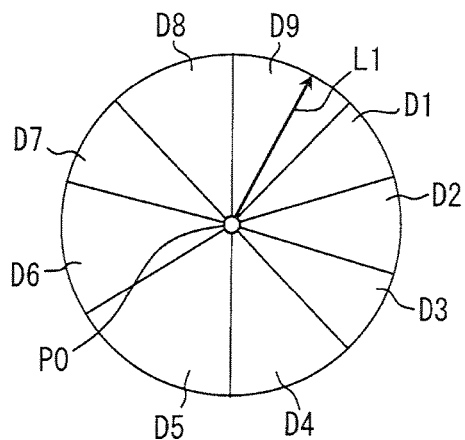
Figure 10C:
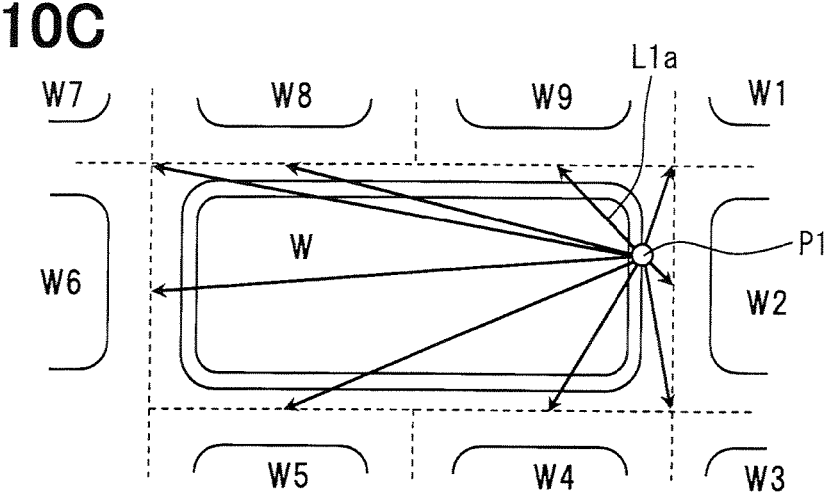

With reference to FIGS. 10A to 10C, the present embodiment is intended to accommodate a situation in which the buttons are not arranged in a clear defined row along the horizontal and vertical axis. In FIG. 10A, lines K8 to K13 are area boundary lines corresponding to the line K3 of FIG. 1, and the signs W, W1 to W9 are respective button areas defined by those lines K8 to K13. In FIG. 10A, the situation is that the button corresponding to the area W is currently selected and emphasized.

Since the area W is displayed in the selected mode and an image of the pointer is not displayed, the user can only recognize that the pointer is positioned in the area W, without knowing where in the area W the pointer exists. Therefore, in a state in which the area W is emphasized on the screen, the user, who has moved the fingertip on the touch pad 11 in a diagonally right upward direction (i.e., arrow L1 in FIG. 10A) with an intention to select a button in the area W9, would result in moving the pointer into the area W1, which is next to the area W9. Such a pointer movement and button selection against user's intention are most likely caused when the previous pointer position P1 is in a right half of the area W.

Such an undesired pointer movement is prevented in the present embodiment by first estimating which one of nine adjacent buttons the user intends to select based on the movement angle calculated in the same manner as S33 of FIG. 7, which corrects the pointer position in the low speed movement.

With reference to FIG. 10B, the MPU 12 determines which one of nine specific ranges D1 to D9 the movement angle calculated falls into. These specific ranges D1 to D9 are net for each button in consideration of the arrangement of adjacent buttons. For example, a center button in the area W has its specific ranges D1 to D9 calculated and set by first setting a specific direction from a center point P0 of such button to each of the adjacent buttons, and by subsequently setting the specific ranges D1 to D9 respectively for each of such specific directions. Therefore, when the movement angle represented as a direction of the arrow L1 falls within the range D9, for example, the specific range D9 is estimated as a user intended angle range for selecting the button area W9.

The MPU 12 then sets a reference line L1a from the previous pointer position P1 to the button area W9, and corrects the current pointer position onto the reference line L1a. Similarly, when the user intention is estimated as selecting one of the other buttons, the MPU 12 corrects the current pointer position onto one of other reference lines represented by other arrows in FIG. 10C. The specific ranges shown in FIG. 10B are preset (i.e. defined) and stored for each of 10 buttons.

In the above-described manner, the movement of the pointer at a low speed leads to (i) an estimation of the user-desired button based on the adjacent button arrangement and the movement angle of the point position, and to (ii) a correction of the pointer position, so that the corrected pointer position gets closer to the desired button. In such manner, the above-described situation of emphasizing the area W1, which is next to the intended area W9 is resolved. Further, when the pointer movement is not at a low speed, the correction of the pointer position for the diagonal pointer movement is prohibited based on an assumption that the user does not intend to select the adjacent button, thereby preventing an emphasis to be added to a non-intended button.

Seventh Embodiment

Figure 11A:
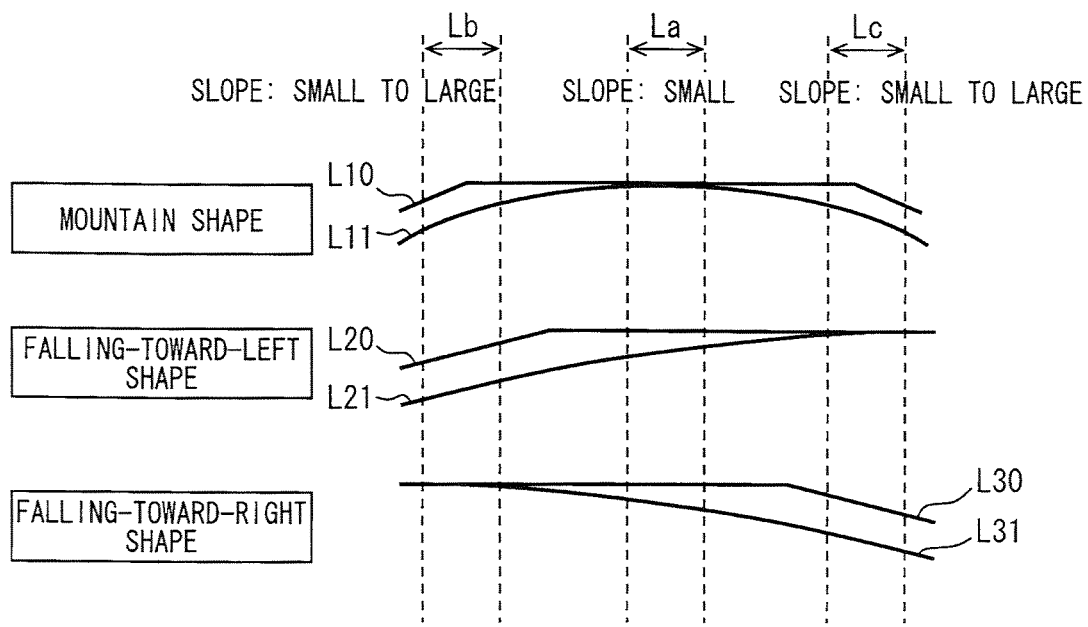
FIGS. 11A and 11B are illustrations of a pointer position correction in a seventh embodiment of the present disclosure.
Figure 11B:
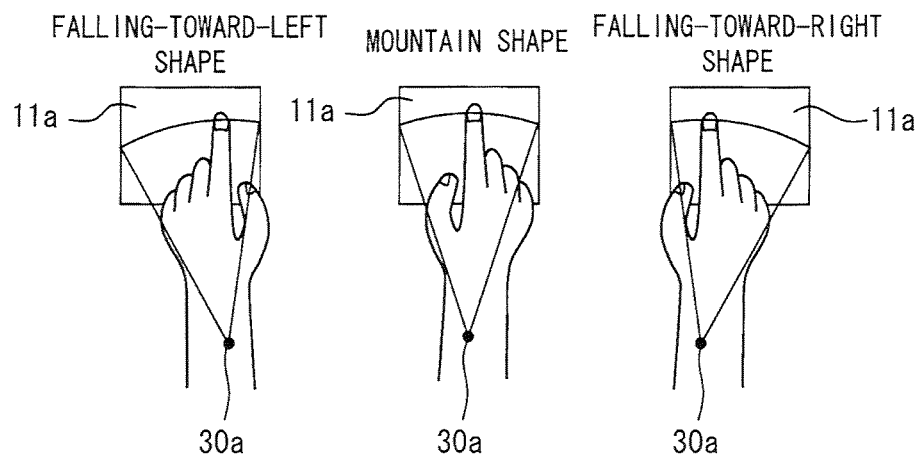

With reference to FIGS. 11A and 11B, in the present embodiment, the longer the amount of the slide movement of the fingertip on the input plate 11a, the wider the specific range is made and set. The amount of the slide movement in this case is a distance or an amount of movement between a pointer position at a time of starting the slide movement and the current pointer position.

For instance, when the fingertip is moved to draw a circular trace, around the center point 30a, as shown in FIG. 11B, the movement angle relative to the reference line (i.e., a slope angle against the reference line) is small while the amount of movement is small, which is indicated as a range La in FIG. 11A. Therefore, by performing the pointer position correction illustrated in FIG. 3, the pointer position is corrected onto the reference line.

In FIG. 11A, L10, L20, L30 represent after-correction traces of the fingertip movement, respectively having a mountain shape L11, a falling-toward left shape L21 or a falling-toward right shape L31.

On the other hand, when the amount of movement is getting greater, which is depicted as ranges Lb and Lc, the movement angle (i.e., the slope angle) against the reference line becomes greater. As a result, since the pointer position departs from the specific ranges A1 and A3, the correction of the pointer position will not be performed.

In view of such situations, the specific ranges (i.e., the specific ranges A1 and A3 in the right or left directions in FIGS. 11A, 11B) are made to have a wider angle range when the amount of the slide movement is greater. In such manner, a departure of the pointer position from the specific ranges A1 and A3 is prevented, thereby always enabling the correction of the pointer position.

Eighth Embodiment

In the present embodiment, the MPU 12 in FIG. 1 sets a wider specific range when the travel speed of the vehicle is faster. When the vehicle is traveling, the trace of the fingertip tends to depart from the intended straight line due to the vibration of the input plate 11a or the fingertip itself. Further, the faster the travel speeds of the vehicle, the greater the amount of vibration should be. Such a situation may result in a higher possibility of departure of the fingertip trace from the intended straight line, causing the fingertip position not falling within the specific range and disabling the pointer position correction.

In view of such a situation, the specific range is made wider for the faster travel speed, thereby more securely capturing the pointer position in the specific ranges and enabling the correction of the pointer position.

Other Embodiments

Although the present disclosure has been fully described in connection with the preferred embodiment thereof with reference to the accompanying drawings, it is to be noted that various changes and modifications will become apparent to those skilled in the art. Further, the advantageous features in each of the above-described embodiments may be arbitrarily combined.

Further, the following modifications may further be implemented:

The current pointer position P2 may be corrected to be positioned closer to the reference line Ka or Kb, instead of correcting the pointer positions to be exactly put on the reference line Ka or Kb as described in each of the above embodiments.

The specific directions may only be set in the right or left directions without having the specific direction for the up and down directions, if the buttons are arranged only along a horizontal straight line in the horizontal axis and are not arranged along a vertical straight line in the vertical axis.

Such changes and modifications are to be understood as being within the scope of the present disclosure as defined by the appended claims.

What is claimed is:

1. A display control apparatus controls a plurality of buttons displayed on a screen of a display unit, the apparatus comprising:
   a detection unit detecting a contact position on an input plate, wherein the input plate is touched by a fingertip of a user;
   a position calculation unit calculating a position of a pointer on the screen, as a pointer position, the pointer position corresponding to the contact position detected by the detection unit;
   a button selection unit selecting one button, as a desired button, from among the plurality of buttons on the screen based on the pointer position;
   a selected button display control unit displaying the desired button on the screen in a display mode different from the buttons not selected; and
   a position correction unit correcting the pointer position to be on or adjacent to a reference line defined on the screen when the pointer position is located within a specific range including the reference line, wherein
   the reference line is defined to extend from a previous pointer position calculated by the position calculation unit at a prior predetermined time to a specific direction;
   the position correction unit prohibits the correction of the current pointer position when the pointer position is not within the specific range;
   a low speed determination unit determining whether a fingertip operation speed is less than a preset value based on the contact position detected by the detection unit, the fingertip operation being less than the preset value indicates a low speed movement of the fingertip operation; and
   a low speed time correction unit correcting the current pointer position to one button of the plurality of buttons being estimated as the desired button when the fingertip operation is determined as the low speed movement of the fingertip operation and without determining whether the current pointer position is within the specific range.

2. The display control apparatus of claim 1, wherein an image representing the pointer position is not displayed on the screen.

3. The display control apparatus of claim 1 wherein
   the position correction unit changes the specific direction to a direction that points to a next desired button selected from among adjacent buttons that are adjacent to a current desired button when the fingertip operation is determined as the low speed movement by the low speed determination unit.

4. The display control apparatus of claim 1, wherein the position correction unit changes the specific direction according to an arrangement of adjacent buttons that are adjacent to a current desired button when the fingertip operation is determined as the low speed movement by the low speed determination unit.

5. The display control apparatus of claim 1, wherein the position correction unit increases a width of the specific range when an amount of slide movement of the fingertip on the input plate toward the current pointer position increases.

6. The display control apparatus of claim 1, wherein
the display unit and the input plate are installed in a vehicle, and
the position correction unit increases a width of the specific range when a speed of the vehicle increases.

7. The display control apparatus of claim 1, wherein
the desired button is estimated based on being positioned adjacent to a currently-selected button.

8. The display control apparatus of claim 1, wherein
the one button of the plurality of buttons being estimated as the desired button is located in a diagonal direction of a currently-selected button of the plurality of buttons.

9. A display system comprising:
a display unit including a screen for displaying a plurality of buttons; and
a display control apparatus controlling the plurality of buttons displayed on the screen of the display unit for displaying one of the plurality of buttons in a manner different from other buttons, the display control apparatus including:
a detection unit detecting a contact position on an input plate, wherein the input plate is touched by a fingertip of a user,
a position calculation unit calculating a position of a pointer on the screen, as a pointer position, the pointer position corresponding to the contact position detected by the detection unit,
a button selection unit selecting one button, as a desired button, from among the plurality of buttons on the screen based on the pointer position,
a selected button display control unit displaying the desired button on the screen in a display mode different from the buttons not selected, and
a position correction unit correcting a current pointer position based on a previous pointer position provided by the position calculation unit as the pointer position at a predetermined time prior to the current pointer position, wherein the current pointer position is corrected to be at a reference line when the reference line extends in a specific direction from the previous pointer position and the current pointer position is within a specific range that is set to include the reference line;
the position correction unit prohibits the correction of the current pointer position when the pointer position is not within the specific range;
a low speed determination unit determining whether a fingertip operation speed is less than a preset value based on the contact position detected by the detection unit, the fingertip operation being less than the preset value indicates a low speed movement of the fingertip operation; and
a low speed time correction unit correcting the current pointer position to one button of the plurality of buttons being estimated as the desired button when the fingertip operation is determined as the low speed movement of the fingertip operation and without determining whether the current pointer position is within the specific range.

10. The display system of claim 9, wherein an image representing the pointer position is not displayed on the screen.

11. The display control apparatus of claim 9, wherein
the desired button is estimated based on being positioned adjacent to a currently-selected button.

12. The display control apparatus of claim 9, wherein
the one button of the plurality of buttons being estimated as the desired button is located in a diagonal direction of a currently-selected button of the plurality of buttons.

* * * * *